(12) United States Patent
Zhai et al.

(10) Patent No.: US 10,571,554 B2
(45) Date of Patent: Feb. 25, 2020

(54) ADAPTIVE POST BEAMFORMATION SYNTHETIC APERTURE FOR ULTRASOUND IMAGING

(71) Applicant: Siemens Medical Solutions USA, Inc., Malvern, PA (US)

(72) Inventors: Liang Zhai, Castro Valley, CA (US); Rickard C. Loftman, Menlo Park, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 587 days.

(21) Appl. No.: 15/364,132

(22) Filed: Nov. 29, 2016

(65) Prior Publication Data

US 2018/0149734 A1     May 31, 2018

(51) Int. Cl.
    *G01S 7/52* (2006.01)

(52) U.S. Cl.
    CPC ........ *G01S 7/52095* (2013.01); *G01S 7/5209* (2013.01); *G01S 7/52049* (2013.01)

(58) Field of Classification Search
    CPC ............. G01S 7/52095; G01S 7/52049; G01S 7/5209; G01S 15/8997
    See application file for complete search history.

(56) References Cited

U.S. PATENT DOCUMENTS

| | | | |
|---|---|---|---|
| 5,113,706 A | 5/1992 | Pittaro | |
| 5,623,928 A | 4/1997 | Wright et al. | |
| 6,309,356 B1 | 10/2001 | Ustuner et al. | |
| 6,666,823 B2 * | 12/2003 | Yao | G01S 7/52034 600/443 |
| 7,744,532 B2 | 6/2010 | Ustuner et al. | |
| 8,088,068 B2 * | 1/2012 | Yao | G01S 7/52046 600/437 |
| 8,241,216 B2 * | 8/2012 | Loftman | G01S 7/52046 600/443 |
| 9,360,552 B2 * | 6/2016 | Bae | A61B 8/5276 |
| 2003/0105401 A1 | 6/2003 | Jago et al. | |
| 2006/0173313 A1 | 8/2006 | Liu et al. | |
| 2007/0083109 A1 * | 4/2007 | Ustuner | G01S 7/52046 600/437 |
| 2009/0306512 A1 | 12/2009 | Loftman et al. | |
| 2012/0283568 A1 | 6/2012 | Loftman et al. | |
| 2018/0242953 A1 * | 8/2018 | Ikeda | G01S 15/8997 |
| 2019/0072671 A1 * | 3/2019 | Nikolov | A61B 8/12 |

OTHER PUBLICATIONS

Lediju, Muyinatu A., et al. "Short-lag spatial coherence of backscattered echoes: Imaging characteristics." IEEE transactions on ultrasonics, ferroelectrics, and frequency control 58.7 (2011): 1377-1388.

* cited by examiner

Primary Examiner — Krystine E Breier (57) ABSTRACT

Coherent combination of ultrasound data for collinear receive beams adapts to the ultrasound data. Beam-to-beam coherence metrics, such as correlation coefficient and/or phase change or functions of these parameters, are used to adapt weighting of the ultrasound data for the receive beams prior to combination or to adapt the results of the combination.

20 Claims, 5 Drawing Sheets

ADAPTIVE POST BEAMFORMATION SYNTHETIC APERTURE FOR ULTRASOUND IMAGING

BACKGROUND

The present embodiments relate to coherent combinations of received ultrasound signals. In particular, adaptive line synthesis is provided for ultrasound.

Commercial ultrasound images are conventionally formed by focused array processing of pulse-echo events. For focusing, constructive interference of the array element signals is assumed to only occur in the case of echoes that were scattered or reflected directly from current desired point of focus, while echoes from any other path will destructively interfere. In practice, the quality of an ultrasound images may be degraded by many factors including side and grating lobes, acoustic aberration, deviation of the speed of sound from assumption, multiple reflection paths, probe or subject motion, inadequate array sampling, or even simply the presence of very strong off-axis scatters in the field.

To address acoustic clutter and aberration, many adaptive beamforming methods have been proposed, such as coherence factor (CF), generalized coherence factor (GCF), phase coherence imaging (PCI), Weiner filtering, minimum variance (MV) beamformation, and short-lag spatial coherence imaging (SLSC). These methods generally require raw acoustic data before beamformation (i.e., channel data). Processing based on channel data may be computationally expensive and storage demanding.

Separately, retrospective transmit focus synthesis is used to combine multiple interrogations of the same image point after beamformation to improve quality of transmit focus away from a physical transmit focus location. The summation of such signals is practically very different from conventional array beamforming. However, synthesis and beamforming are governed by very similar physical principals.

SUMMARY

By way of introduction, the preferred embodiments described below include a method, instructions and systems for adaptive line synthesis. Coherent combination of ultrasound data for collinear receive beams adapts to the ultrasound data. Beam-to-beam coherence metrics, such as correlation coefficients and/or phase changes or functions of these parameters, are used to adapt weighting of the ultrasound data for the receive beams prior to combination or to adapt the results of the combination.

In first aspect, a method is provided for adaptive ultrasound processing in an ultrasound system. Spatially distinct first receive beams are formed as responsive to a first transmit event. Spatially distinct second receive beams are formed as responsive to a second spatially distinct transmit event, where at least one of the first beams is substantially collinear with one of the second beams. A correlation coefficient or phase difference between the substantially collinear receive beams is calculated. A weight is set as a function of the correlation coefficient or phase difference. The substantially collinear receive beams responsive to the spatially distinct first and second transmit events are coherently combined where the combining or an output of the combining being a function of the weight. An image is generated from the output of the coherent combination.

In a second aspect, a system is provided for adaptive post-beamformation synthetic aperture. A transmit beamformer is configured to transmit first and second transmit beams along first and second scan lines. The first scan line is different than the second scan line. A receive beamformer is configured to receive a first receive beam in response to the first transmit beam and a second receive beam in response to the second transmit beam. The first receive beam is collinear with the second receive beam. A processor is configured to determine a coherence metric and/or function of the coherence metric between the first and second receive beams. A coherent summer is configured to coherently combine the first and second receive beams. The combination or an output of the combination is a function of the coherence metric. A display is configured to generate an image from the output.

In a third aspect, a computer readable storage medium has stored therein data representing instructions executable by a programmed processor adaptive post-beamformation synthetic aperture. The storage medium includes instructions for calculating beam-to-beam correlation coefficient or beam-to-beam phase change for ultrasound data of collinear beams acoustically formed in a patient, and generating an ultrasound image as a function of the correlation coefficient or phase change and the collinear beams.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Post-beamforming synthetic aperture ultrasound imaging adapts to coherence metrics of data used to synthesize. Adaptive discrimination techniques are applied based on post-beamformation signals used in retrospective transmit focus synthesis. The advanced methods developed for array beamforming are applied to retrospective or post-beamforming transmit focusing. Signals generated from acoustic clutter or incoherent noise sources or fast moving targets have lower temporal coherence and/or higher phase dispersion. By calculating the correlation coefficients and/or phase shifts for every point among collinear receive beams or functions of these variables, weighting functions are computed and applied either to individual collinear beam components before summation or to the output image after coherent summation, or both. The output image amplitude may be adaptively adjusted based on coherence (e.g., the correlation amplitudes and/or phase dispersion) among post beamforming collinear beams. For every spatial point, the contribution from each component beam may be adaptively adjusted based on coherence metrics or functions of these parameters. Additional threshold comparisons may identify and suppress regions of blood flow.

In contrast to array beamforming, the adaptation operates on post-beamforming data, data that has had a first focusing operation performed already. The implementation and computation complexities are much lower in comparison to techniques applied to pre-beamforming data. The adaptation may overcome clutter and motion issues during transmit aperture synthesis. The clutter may be reduced, and the contrast may be improved. Motion artifact of the blood flow may be suppressed. Rather than forcing the user to adjust many different controls to optimize, the adaptation may allow for fewer adjustments and less time to obtain the optimal image.

Figure 1:
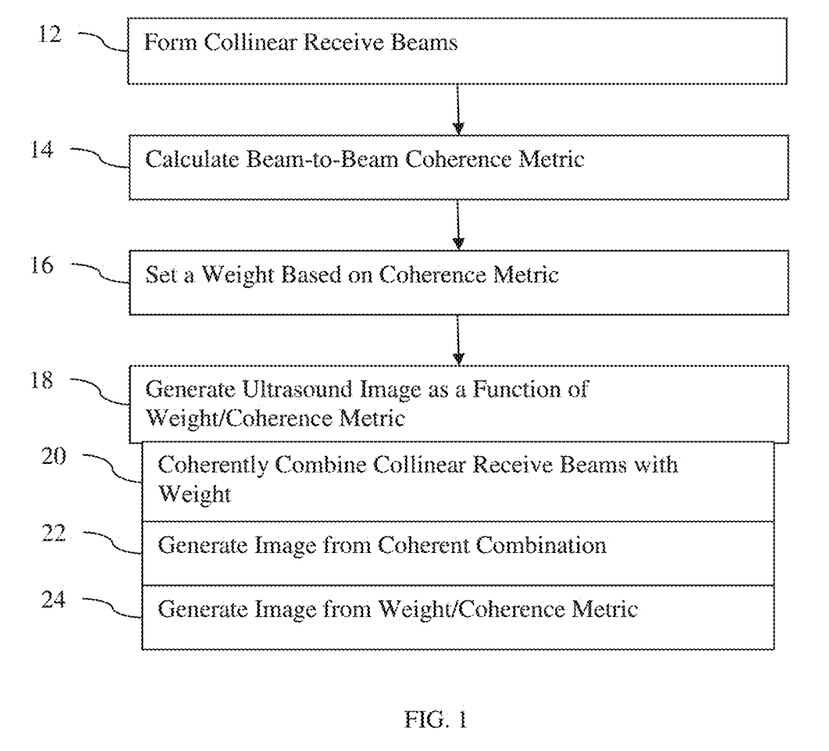
FIG. 1 is a flow chart diagram of one embodiment of a method for adaptive ultrasound processing in an ultrasound system.

FIG. 1 shows one embodiment of a method for adaptive ultrasound processing in an ultrasound system. Using coherence metrics (e.g., beam-to-beam correlation coefficients or phase changes), the coherent combination of ultrasound data from collinear receive beams adapts.

Figure 6:
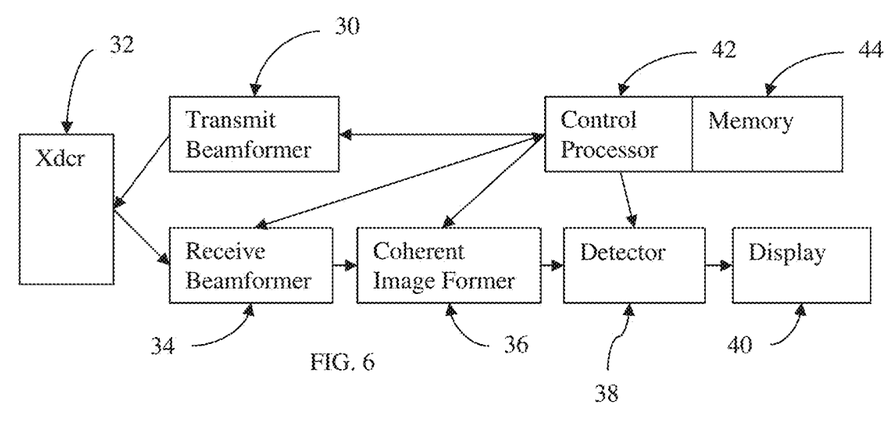
FIG. 6 is a block diagram of one embodiment of a system for adaptive post-beamformation synthetic aperture.

The method of FIG. 1 is performed by the system of FIG. 6 or a different system. For example, a beamformer performs act 12. The beamformer, beamformer controller, control processor, or coherent image former performs acts 14-20. A detector, scan converter, control processor, the coherent image former, and/or display performs acts 22 and 24. Other devices, such as a workstation, server, or computer may perform the non-scanning acts 14-24.

Additional, different or fewer acts may be provided. For example, ultrasound data from collinear receive beams is acquired from memory as already formed, so act 12 is not performed. As another example, act 16, act 18, and/or act 24 are optional or not performed. In other examples, acts 14 and 20 are performed with or without other acts, or acts 14 and 18 are performed with or without other acts.

The acts are performed in the order shown (i.e., numerically or top to bottom). The acts may be performed in other orders.

In act 12, a receive beamformer forms one or more receive beams from acoustic echoes in a scan of the patient. The receive beams are formed in response to each transmit beam generated by a transmit beamformer. Spatially distinct transmit beams (e.g., along different scan lines or with different transmit parameter values) are used to form collinear receive beams (e.g., receive beams along a same scan line). For example, with three or more different collinear receive beams, at least two of the three or more collinear receive beams are responsive to spatially distinct transmissions. Coherent combination synthesizes the collinear receive beams after beamformation and prior to detection. Where multiple simultaneous receive beams are formed in response to each transmit beam, the different receive beams may be collinear with receive beams responsive to one or more other spatially distinct transmit beams. Each or different sets of the collinear receive beams are responsive to spatially distinct transmissions.

Figure 2:
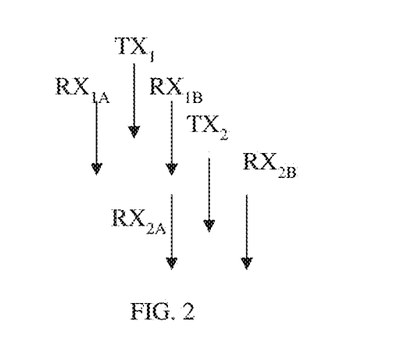
FIG. 2 is a graphical representation of one embodiment of transmit and receive beam interrelationships.

Referring to FIG. 2, multiple noncollinear receive beams ($RX_{1A}$ and $RX_{1B}$, and $RX_{2A}$ and $RX_{2B}$) are formed in parallel or substantially simultaneously in response to each transmit firing ($TX_1$ and $TX_2$, respectively). The set of spatially distinct beams formed in parallel is called noncollinear multibeam or multibeam. As the number of beams in a multibeam increases (e.g., three or more), the transmit beam is wider to adequately insonify the locations of the receive beams. The wider transmit beam causes a decrease in resolution, increase in artifacts, and decrease in signal-to-noise ratio (SNR). With receive multibeam, lateral resolution is limited to the one-way receive only resolution due to lack of or weak transmit focusing. The acoustic clutter is high and therefore contrast resolution is limited in the presence of aberration due to lack of redundancy. Redundancy at a spatial frequency is the attribute of having more than one transmit-receive element pair contributing to that spatial frequency. Image uniformity is compromised, and the image becomes shift-variant due to lateral nonuniformity of the transmit main lobe.

Coherent combination may reduce some or all of the image degradation. In the example of FIG. 2, one receive beam ($RX_{2A}$) from one transmit event is collinear with another receive beam ($RX_{1B}$) from another transmit event. The line synthesis of the collinear receive beams may improve resolution and reduce artifacts. The lateral resolution to the confocal (two-way) equivalent lateral resolution is increased since it is effectively a transmit synthetic aperture technique. Contrast resolution is improved in the presence of aberration by adding redundancy through the spatially distinct transmit beams. Image uniformity is improved by reducing shift variance.

At each transmit event (e.g., $TX_1$ or $TX_2$), the transmit beamformer sends a single beam, or multiple beams in parallel. FIG. 2 shows two transmit beams $TX_1$ or $TX_2$ generated at different times. Each transmit beam is focused (i.e., converging wavefront), unfocused (planar wavefront) or defocused (diverging wavefront) and propagates along a nominal transmit beam axis or transmit line. The transmit beams formed in parallel may be collinear (share the same transmit line), or noncollinear.

Beams of a noncollinear transmit multibeam may have one or more distinct transmit beamforming or pulse shaping parameters, in addition to having distinct transmit lines. Collinear transmit beams formed in parallel or substantially simultaneously (collinear transmit multibeam) may differ in one or more of the transmit beamforming and pulse shaping parameters, such as focal depth, center frequency, apodization type, aperture width, bandwidth or other transmit beam characteristic. Additionally, different pulse codes (e.g., Barker, Golay, Hadamard codes or other orthogonal complementary code sets) can be transmitted simultaneously, and the received signals are decoded to separate out the signals corresponding to each transmit beam.

At each receive event, the receive beamformer receives echoes from the object, and forms a beam or multiple beams in parallel. FIG. 2 shows two spatially distinct transmit events, and two receive beams formed in parallel or substantially simultaneously with each other in response to each transmit event. Three or more receive beams may be formed, including with or without a receive beam along the transmit line or collinear with the transmit beam. Each receive beam is dynamically focused along a nominal receive beam axis or receive line. The receive beams formed in parallel may be collinear (share the same receive line) or noncollinear. The collinear receive beams formed in parallel (collinear receive multibeam) may differ in one or more of the receive beamforming or pulse shaping parameters, such as the aperture center, aperture width, apodization type, center frequency, bandwidth or other receive beam characteristics. The non-collinear beams of a receive multibeam have different delay and/or phase profiles. The remaining receive beamforming or echo shaping parameters, such as aperture center, aperture width, apodization type, receive filter center frequency, bandwidth and spectral shape, may be the same or different.

Figure 3:
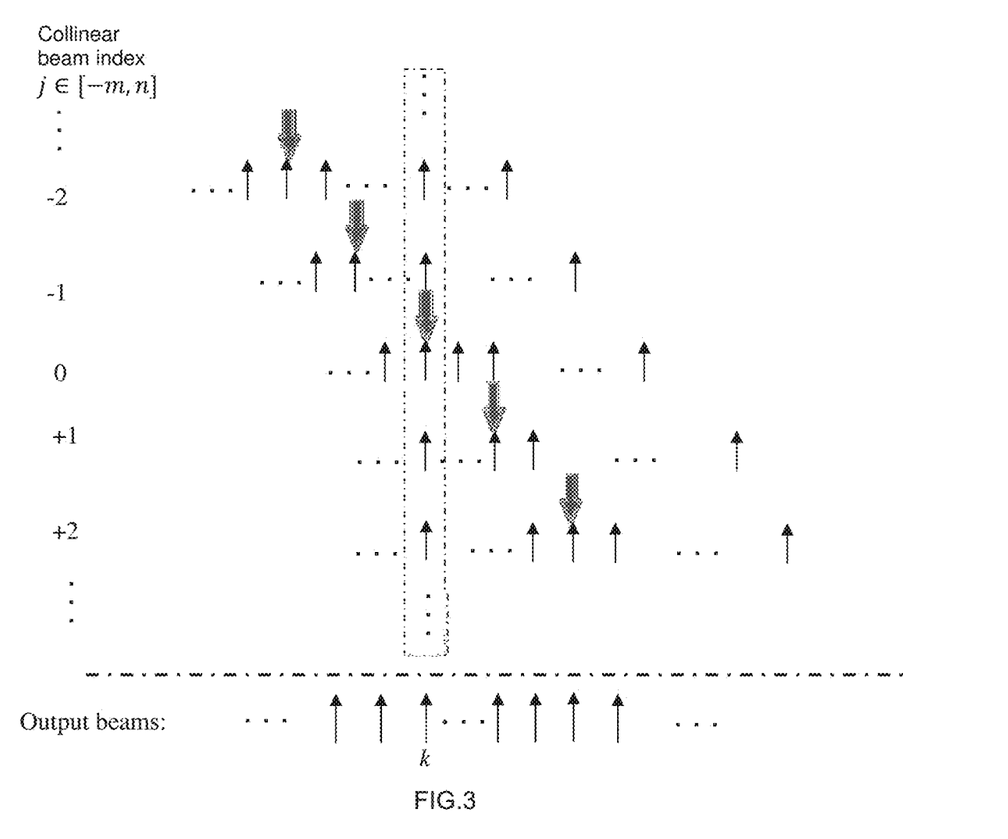
FIG. 3 is another graphical representation of other example of transmit and receive beam interrelationships.

FIG. 3 shows another example of forming ultrasound data from collinear receive beams resulting from spatially distinct transmit beams. Non-interpolated or actual beam-formed receive beams are represented as upward pointing arrows. Interpolated or other synthetically formed receive beams may also be used. Downward pointing arrows represent transmit beams. Each horizontal grouping indexed (−m through n, such as −2 to 2) on the left represents a given transmit beam and any number of responsive receive beams. Five transmit and receive event pairs are shown, but other numbers may be used. In this example, there are five collinear receive beams at azimuth position k. The same or different number of collinear receive beams are provided at other positions.

During aperture synthesis of transmit focus, an output beam is produced by coherently summing ultrasound data (e.g., beamformed data) from a number (e.g., 5) of collinear receive beams after geometry-based delay and phase adjustment and scaling of individual component beams. In the diagram, there are (m+n+1) collinear receive beams from distinctive transmit beams to produce the output beam k (e.g., coherently combine the collinear receive beams to create output beam k). $y(k,r)$ represents the output image, where k and r are the azimuth and range dimension, respectively. $b(j,k,r)$ represents the jth collinear beam at the kth azimuth location. Other numbers of collinear receive beams and/or transmit beams used to form the number of collinear receive beams may be used.

The receive beamformed ultrasound data of the collinear receive beams maintain coherence. The relative phase and magnitude are maintained, such as using in-phase (I) and quadrature (Q) data or radio frequency (RF) data output by the receive beamformer.

The ultrasound data may be processed prior to combination and/or calculation of coherence metrics. For example, a low-pass filter is applied along the range, azimuth, and/or elevation. Depending on the variation in spatial position of the component receive beams to the corresponding transmit beams (e.g., receive beam for index −2 at position k is spaced further from the transmit beam than the receive beam for index 0 at position k), further phase and/or range adjustments may be made. The relative geometry differences may or may not be accounted for by altering the phase and/or amplitude of a given receive beam. "Substantially" collinear is used to account for deviations from the given scan line due to the different relative position of component receive beams to the corresponding transmit beam.

Referring again to FIG. 1, a processor (e.g., beamformer controller, image former, or control processor) calculates a coherence metric or coherence metrics for every spatial point in act 14. Any coherence metric may be used, such as correlation coefficients or phase changes, or functions of these parameters. A kernel or window size or number of samples or depth range is defined to perform correlation or compute phase changes. The correlation coefficients may be computed using normalized cross-correlation, cross-correlation, or any other measure similarity of two signals. For phase changes, any phase tracking or other phase change measure computing the phase shift or difference between receive beams may be used.

The coherence metric may be a function derived from another coherence metric. For example, when there are 3 or more collinear beams, a standard deviation of the beam-to-beam correlation coefficients or the phase changes is calculated. Other information may be included in the function as well, such as normalizing, averaging, or statistical derivatives of these coherence metrics. Combinations of coherence metrics may be used, such as calculating with a function with both the beam-to-beam correlation and the beam-to-beam phase change.

The coherence metric is calculated between the collinear receive beams. In the example of FIG. 2, the coherence metric is calculated between the ultrasound data of $RX_{1B}$ and $RX_{2A}$. In the example of FIG. 3, the coherence metric is calculated between ultrasound data for any two or more of the collinear receive beams at output beam position k.

Where there are three or more collinear receive beams, the coherence metric may be calculated for all the receive beams using a covariance matrix. Any combinations of receive beams may be used, such as calculating each 1st lag correlation. For example in FIG. 3, the first lag correlation is found between −2 and −1, −1 and 0, 0 and 1, and 1 and 2, and then the correlation coefficients are averaged. Second, third, or other lag of correlation may be used. A correlation coefficient calculated by correlation of all beams together may be used.

The calculation is repeated for other scan lines and corresponding data for collinear receive beams. The statistic varies with range. A kernel of any depth range may be used to determine the statistic at a given depth. The kernel is moved in range to determine the statistic at other ranges. Alternatively, the kernel covers the entire receive beam or a given portion and one value of the statistic is provided for a given pair or group of collinear receive beams. The kernel size may be chosen to trade off sensitivity and resolution.

In one embodiment, $\rho(j_1,j_2,k,r)$ and $\varphi(j_1,j_2,k,r)$ are the $(j_2-j_1)$th lag correlation coefficient and phase shift between the $j_1$th and $j_2$th collinear beams at the depth r at the output beam position k, respectively. $\rho(j_1,j_2,k,r)$ is a normalized cross correlation or scaled in other ways (e.g., other than normalized to 0-1). $\rho(j_2-j_1=1,k,r)$ and $\varphi(j_2-j_1=1,k,r)$ represent the first lag correlation and the corresponding phase shift at the spatial location (k,r). In the example of FIG. 3, the receive beam of index 0 at k has the least misalignment to its transmit beam center. The ultrasound data of this receive beam is assigned as the central or reference. When $j_2$ is constant and $j_2=0$, $\rho(j_1,0,k,r)$ and $\varphi(j_1,0,k,r)$ represent the correlation and phase change between the $j_1$th receive beam to the $0^{th}$ collinear beam. Other receive beams may be selected as the reference. Alternatively, no receive beam is the reference, but instead the coherence metric is calculated with different combinations of receive beams.

In act 16 of FIG. 1, a processor sets a weight or weights as a function of the coherence metric (e.g., correlation coefficient or phase shift or variation). The coherence metric or the value resulting from the function including the coherence metric may be used as the weight (i.e., a separate weight is not set). For example, the standard deviation of all or a subset of $1^{st}$ lag correlation coefficients or phase changes is used rather than just the correlation coefficients or phase changes.

Any function relating the output of act 14 with a weight or weights may be used. For example, a linear or non-linear mapping of coherence metric or value resulting from the function to a weight is provided. The weight or weights may be mapped from a plurality of coherence metrics.

The mapping may be implemented as a look-up table. Alternatively, a function is used to determine the weight from the value of the coherence metric.

In one embodiment, weight are determined for the ultrasound data for each of the collinear receive beams. For example, five weights with the same or different values are formed for each of the five collinear receive beams of FIG. 3. Each weight is based on the coherence metric of that collinear receive beam to one or more of the other collinear receive beams.

One weight may be used. The coherence metric from all or a sub-set of the collinear receive beams is used to determine the weight. The weight may be used to scale the ultrasound data of one of the receive beams prior to combination and/or to scale an output of the combination (i.e., weight the amplitude of the ultrasound data of the synthetically formed receive beam).

The coherent combination includes the weighting. The coherent combination may be expressed as:

$$y(k, r) = \frac{1}{C} \sum_{j=-m}^{n} w(j, k, r) \cdot b(j, k, r) \qquad (1)$$

where $w(j,k,r)$ is the weighting function, whose value is computed based on $b(j,k,r)$, $\rho(j_1,j_2,k,r)$, and/or $\varphi(j_1,j_2,k,r)$. C is a global scaling constant so that the output image will have a proper intensity level. For example, C is equal to the number of collinear receive beams or number of terms in the sum.

In one embodiment, the contributions of individual collinear beams to the final output are weighted based on their correlation coefficient to the central beam. In this case, $$w(j, k, r) = \rho(j, 0, k, r) \qquad (2)$$

$$y(k, r) = \frac{1}{C} \sum_{j=-m}^{n} \rho(j, 0, k, r) \cdot b(j, k, r) \qquad (3)$$

The weights are applied to the ultrasound data of the collinear receive beams prior to or as part of the weighted sum. The weight for each component receive beam is based on the correlation of the ultrasound data of that receive beam with the ultrasound data of the reference receive beam. The reference receive beam is weighted as unity (e.g., x 1).

In another embodiment, $1^{st}$ lag correlation coefficients are used to determine the weights:

$$w(j,k,r) = \rho(j,0,k,r) \cdot \Sigma_{-m \leq j_1 < j_2 \leq n} \rho(j_2 - j_1 = 1, k, r) \qquad (4)$$

Thus, $$y(k, r) = \qquad (5)$$
$$\frac{1}{C} \left( \sum_{j=-m}^{n} \rho(j, 0, k, r) \cdot b(j, k, r) \right) \cdot \left( \sum_{-m \leq j_1 < j_2 \leq n} \rho(j_2 - j_1 = 1, k, r) \right)$$

The weights are applied to the ultrasound data of the collinear receive beams prior to or as part of the weighted sum. The weight for each component receive beam is based on the 1st lag correlation of the ultrasound data of that receive beam with the ultrasound data of the other receive beams. There is no specific reference receive beam.

In yet another embodiment, phase dispersion (e.g., variance of the phase or the variance of $1^{st}$ lag phase shift) is used to set the weight. When the echo signals become incoherent, a higher dispersion in the signal phase is expected. The variance (i.e., standard deviation) of $1^{st}$ lag phase shift is used in the below example. To simplify the notation, $\varphi_i$ is used to represent the $1^{st}$ lag phase change at position (k,r). $\varphi_1$ is $(-m,-m+1,k,r)$; $\varphi_2$ is $\varphi(-m+1,-m+2,k,r)$, and so on.

$$w(k, r) = \begin{cases} 1 - \frac{std(\varphi_i)}{M}, & M \text{ is a constant} \\ 0, & \text{if } std(\varphi_i) > M \end{cases} \qquad (6)$$

$$y(k, r) = \frac{1}{C} w(k, r) \cdot \sum_{j=-m}^{n} b(j, k, r) \qquad (7)$$

The standard derivation of $\varphi_i$ is computed in a min-arc fashion, but other approaches may be used.

In other embodiments, more than one statistic is used to set the weight. For example, the weight or weights are a function of both the correlation and the phase consistency. In one approach, the weight is a function of the $1^{st}$ lag cross-correlation coefficient (cc2) and the $1^{st}$ lag phase change (phi2). The weight is (1−std(phi2)/A)*mean(cc2)* (1−std(cc2)) where "std" is the standard deviation and A is a constant. A may be inversely linear to sensitivity to phase dispersion, such as A=1.25. Other combinations of coherence metrics may be used.

Other functions may be used to mask or scale component collinear beams. For example, at a certain azimuth location, when a phase change from a given beam to the central receive beam exceeds a threshold, the contribution is scaled down or zeroed out. As another example, when the $1^{st}$ lag correlation is below certain threshold or the $1^{st}$ lag phase change is large (i.e., above a threshold), this indicates noise or significant motion in that area. Correspondingly, the pixel values in the output are scaled down by assigning a weight less than unity.

The weighting varies by azimuth location (i.e., k), elevation location, and/or range location. In one embodiment, an output beam may or may not be produced or summed from multiple collinear beams. For example, the output beam is simply one of the collinear beams for some conditions (i.e., weight of 1.0 for the selected ultrasound data and weight of 0 for the ultrasound data of the other collinear receive beams). As another example, part of the output beam is chosen from part of just one collinear beam. Then, this output image is weighted by a weighting function.

In act 18, the ultrasound system (e.g., control processor, detector, scan converter, and/or coherent image former) generates an ultrasound image that is a function of the coherence metric. The weight, weights, coherence metrics, or derivations from the coherence metrics are used to generate the image. For example, the beam-to-beam correlation or variation of the $1^{st}$ lag phase changes are used.

The ultrasound image may be generated directly from the weights or coherence metric, such as being an image showing spatial variation of the coherence metric. Alternatively, the ultrasound image is from the coherent combination. Based on the weighting, the coherent combination or output of the coherent combination is a function of the coherence metric.

Acts 20-24 represent some embodiments for generating the ultrasound image. Acts 20 and 22 may be performed without act 24. Similarly, act 24 may be performed without acts 20 and 22. All three acts may be performed together, providing two different images.

In act 20, the substantially collinear receive beams responsive to the spatially distinct transmit events are coherently combined. A line is synthesized by combining ultrasound data from collinear receive beams. The ultrasound data is combined using both the relative phase and amplitude, analytically synthesizing ultrasound data representing the collinear beams. Multiple collinear receive beams, at least some of which are formed in response to a spatially distinct transmit beam, are combined prior to amplitude detection. The collinear receive beams combined to form a synthetic line are referred to as component beams. Component beams are combined by a synthesis function. The synthesis or coherent combination function may be a simple summation or a weighted summation operation, but other functions may be used. The synthesis function includes linear or nonlinear functions and functions with real or complex, spatially invariant or variant component beam weighting coefficients. Nonlinear synthesis functions also include products or sum of powers with signs preserved. Nonlinear functions may also be implemented as arbitrary multi-input single-output maps.

The line synthesis is adaptive, such as represented in equations 1, 3, 5, or 7. The weights adapt to the coherence metric. For example, the beam-to-beam correlation or beam-to-beam phase dispersion is used to weight the component beams prior to combination and/or to weight an output of the combination. The output of the coherent combination adaptively responds to received ultrasound information. The adaptation occurs substantially constantly, periodically, or in response to a trigger event (e.g., heart cycle event, user activation, or detection of another event).

The adaptation is applied as part of the coherent combination and/or to an output of the coherent combination. For applying as part of the combination, the contributions of one, some, or all the collinear receive beams are weighted. This weighting adjusts the relative contribution of the component beams in the combination. The weighted ultrasound data for the different collinear receive beams are combined. For applying to the output, a weight is provided for each location. The output amplitude is scaled by the weight. The ultrasound data for the component beams are combined, and then the result of the combination is weighted.

In act 22, a display generates an image from the output of the coherent combination. The ultrasound system (e.g., detector, scan converter, and/or coherent image former) maps scalar values for the ultrasound data to display values (e.g., RGB). The display values are loaded into a display plane, from which the display generates the image.

The output of the coherent combination for each scan line is a synthesized line. The line is synthesized from the ultrasound data of the collinear receive beams. Based on the weighting applied to the component beams and/or the output of the coherent combination, the resulting ultrasound data is a function of the coherence metric. For each pixel, voxel, or scan location, the coherent combination is performed. Thus, an image of a one, two, or three-dimensional set of locations in the patient is generated, based in part, on the coherence metric. For example, both the beam-to-beam correlation and the beam-to-beam phase consistency are used in generating the ultrasound image with a synthetic aperture.

All the locations represented in the ultrasound image are based on coherence metric adaptive coherent combination. One or more locations represented in the image may be generated from ultrasound data from just one receive beam. Parts of the image may be generated without coherent combination. Parts of the image may be generated with coherent combination but without adaptation to the coherence metric.

In act 24, the display generates a multi-dimensional representation of the weight or the coherence metric. Instead of or in addition to generating the image from the coherent combination in act 22, the coherence metric or weighting is mapped to the display values. The pixel brightness and/or color is modulated only by or primarily by the weight or coherence metric. For example, the computed coherence parameters, such as $1^{st}$ lag correlation $\rho(j_2-j_1=1,k,r)$, correlation $\rho(j_1,0,k,r)$, $1^{st}$ lag of phase consistency $\varphi(j_2-j_1=1,k,r)$, other coherence metric, or functions of these coherence metrics (e.g., stand deviation among all 1st lag phase, $\varphi(j_2-j_1=1,k,r)$), are displayed as an independent image. Multiple images from different coherence metrics may be used.

Figure 4A:
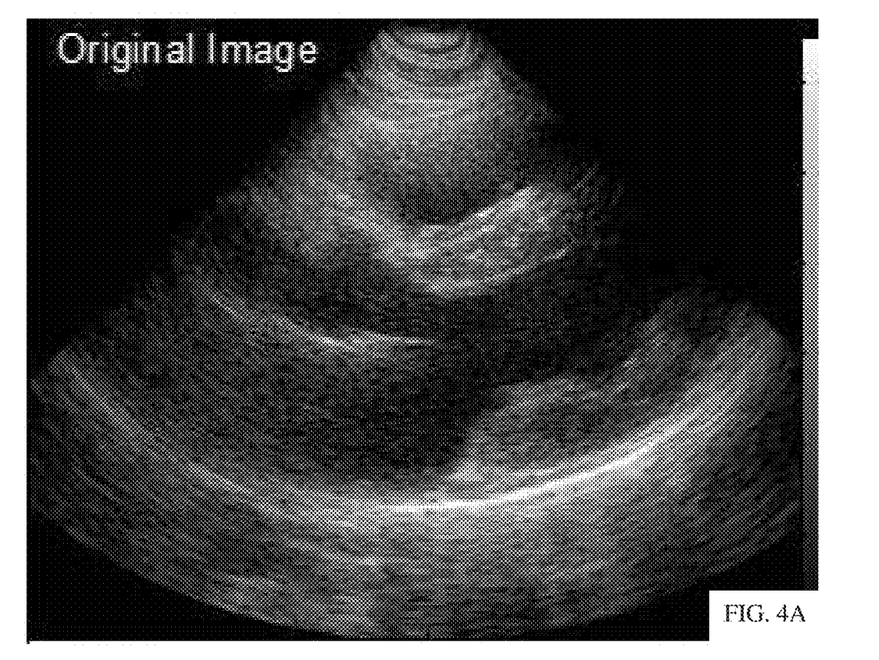
FIGS. 4A-D are example images of a coherent combination and corresponding coherence metrics.
Figure 4B:
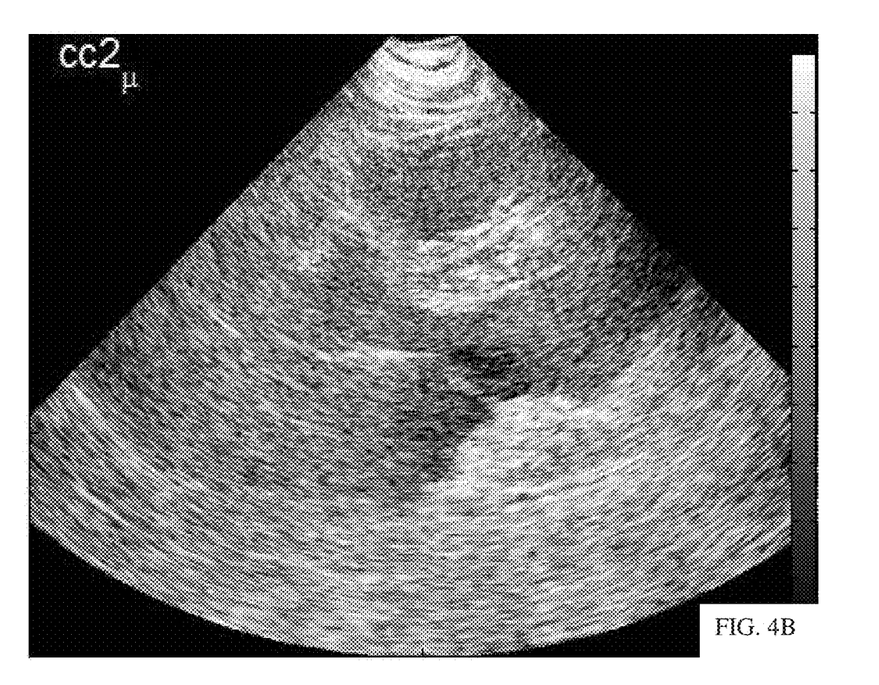
Figure 4C:
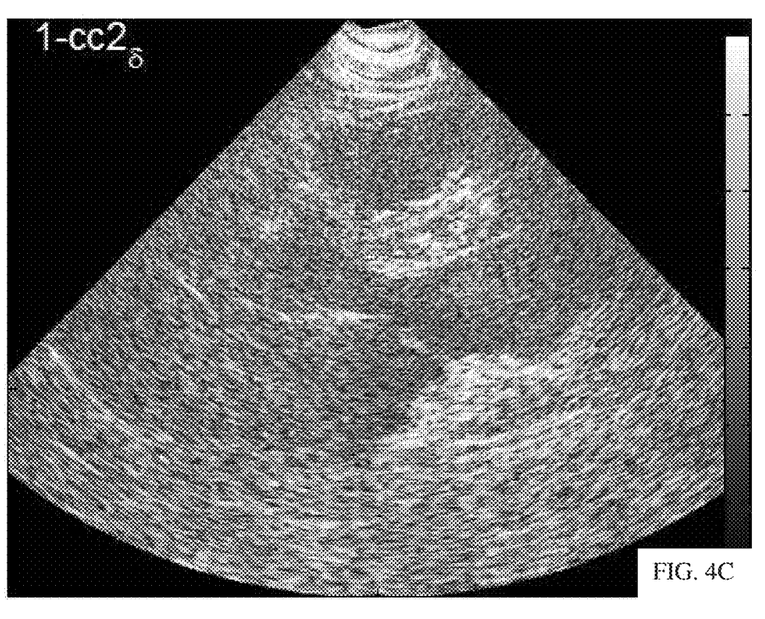
Figure 4D:
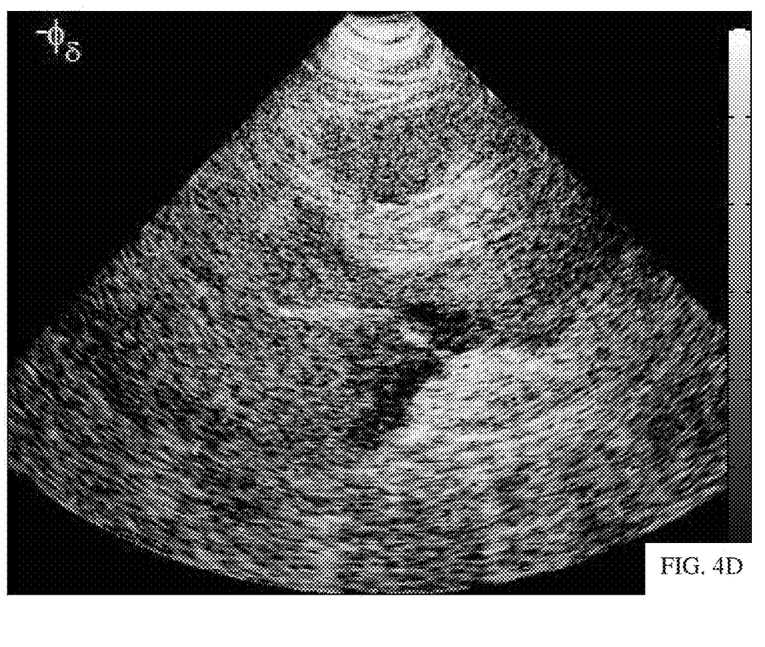

FIGS. 4A-D show examples. FIG. 4A is an ultrasound image generated using coherent combination, but without adaptation based on the coherence metrics. The ultrasound image is generated as taught in U.S. Pat. No. 5,113,706, the disclosure of which is incorporated herein by reference. FIGS. 4B-D are generated using coherence metric adaptive post-beamforming synthetic aperture. FIG. 4B maps the mean value of the $1^{st}$ last cross correlation coefficient to gray values. FIG. 4C maps the inverse of the standard deviation of the 1st lag correlation coefficient to gray values. FIG. 4C maps the inverse of the standard deviation of the 1st lag correlation phase to gray values.

Figure 5A:
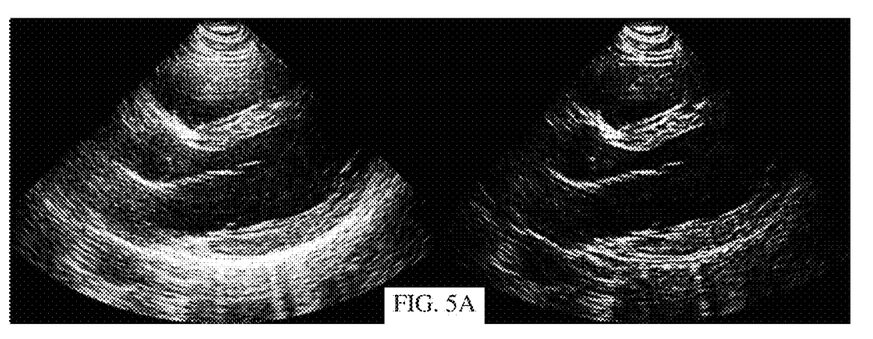
FIGS. 5A and 5B show two example coherent combinations without and with adaptation to coherence metrics.
Figure 5B:
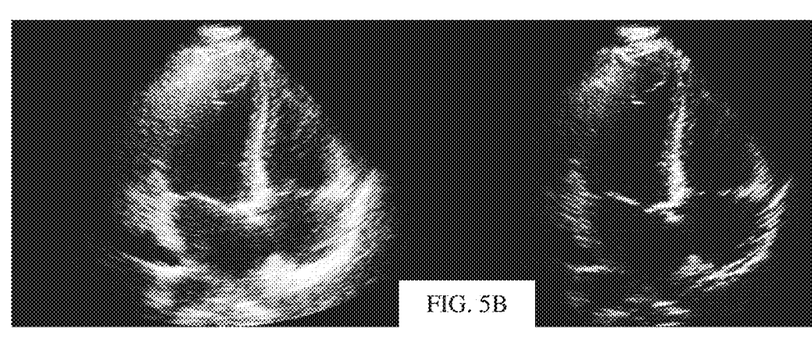

FIGS. 5A and 5B show B-mode images generated using coherent combination. The output of the coherent combination is mapped to gray scale values. FIG. 5A is generated from a scan of a male patient. FIG. 5B is generated from a scan of a female patient. The left images are formed by coherent combination, but without adaptation based on the coherence metric. The right images are formed by coherent combination with adaptation to the coherence metrics. In particular, the output of the coherent combination (e.g., the right image, im0) is weighted. The weight is the inverse of the standard deviation (std) of the 1st lag phase change (phi2), divided by a constant (A=1.25), all multiplied by a mean of the 1st lag cross correlation coefficient (cc2) and multiplied by the inverse of the standard deviation (std) of the 1st lag cross correlation coefficient.

$$I = I_0\left(1 - \frac{std\varphi_2}{A}\right)(\mathrm{mean}(cc_2))(1 - std(cc_2))$$

In either case, 15 collinear beams are generated using an Acuson SC2000™ ultrasound system.

The coherence metric adaptive images (right side) have less clutter than the non-adaptive images (left side). The adaptive images are more clear due to suppression of side lobes, grating lobes, noise, and returns form fast movement (i.e., blood).

FIG. 6 shows one embodiment of a system for adaptive post-beamformation synthetic aperture. The system implements the method of FIG. 1 or another method. Collinear receive beams are formed by scanning with spatially distinct transmit beams and multibeam receive operations. The ultrasound system coherently combines ultrasound data from collinear receive beams. The coherent combination adapts to coherence metrics of the ultrasound data being combined.

The adaptation is applied to the ultrasound data of the component beams for combining and/or to an output of the combination.

The system is a medical diagnostic ultrasound imaging system, but other imaging systems using multiple transmit or receive antennas (i.e., elements) may be used. The system includes a transducer 32, a transmit beamformer 30, a receive beamformer 34, a coherent image former 36, a detector 38, a display 40, a control processor 42, and a memory 44. Additional, different or fewer components may be provided, such as the system with a scan converter and/or user interface.

The transducer 32 is an array of a plurality of elements. The elements are piezoelectric or capacitive membrane elements. The array is configured as a one-dimensional array, a two-dimensional array, a 1.5D array, a 1.25D array, a 1.75D array, an annular array, a multidimensional array, combinations thereof, or any other now known or later developed array. The transducer elements transduce between acoustic and electric energies. The transducer 32 connects with the transmit beamformer 30 and the receive beamformer 34 through a transmit/receive switch, but separate connections may be used in other embodiments.

Two different beamformers are shown in the system 10, a transmit beamformer 30 and the receive beamformer 34. While shown separately, the transmit and receive beamformers 30, 34 may be provided with some or all components in common. Both beamformers connect with the transducer 32. The beamformer parameters used by the transmit beamformer 30, the receive beamformer 34, or both are set for line synthesis. The beamformer parameters may be used as line synthesis parameters for forming the component beams.

The transmit beamformer 30 is a processor, delay, filter, waveform generator, memory, phase rotator, digital-to-analog converter, amplifier, combinations thereof, or any other now known or later developed transmit beamformer components. The transmit beamformer 30 has a plurality of channels for generating electrical signals of a transmit waveform for each element of a transmit aperture on the transducer 32. The waveforms have relative delay or phasing and amplitude for focusing the acoustic energy. The transmit beamformer 30 is configured by loading a sequence by a controller. To transmit a transmit beam, the controller sets an aperture (e.g. the number of active elements), an apodization profile across the plurality of channels, a delay profile across the plurality of channels, a phase profile across the plurality of channels and/or combinations thereof. A scan line focus is generated based on these beamforming parameters. More than one transmit beam may be simultaneously generated along more than one scan lines.

The controller causes the transmit beamformer 30 to transmit a sequence of transmit beams. The transmit beams are transmitted along different scan lines. In a linear, sector, Vector, or other scan format, spatially distinct transmit beams are generated.

The receive beamformer 34 is a preamplifier, filter, phase rotator, delay, summer, base band filter, processor, buffers, memory, combinations thereof or other now known or later developed receive beamformer components. The receive beamformer 34 has a plurality of channels for receiving electrical signals representing echoes or acoustic energy impinging on the transducer 32. Beamforming parameters including a receive aperture (e.g., the number of elements and which elements are used for receive processing), the apodization profile, a delay profile, a phase profile and combinations thereof are applied to the receive signals for receive beamforming. For example, relative delays and amplitudes or apodization focus the acoustic energy along one or more scan lines. A control processor controls the various beamforming parameters for receive beam formation. Beamformer parameters for the receive beamformer 34 are the same or different than the transmit beamformer 30.

Receive beamformer delayed or phase rotated baseband data for each channel is provided to a buffer. The buffer is a memory, such as a first in, first out memory or a corner turning memory. The receive beamformer 34 includes one or more digital or analog summers operable to combine data from different channels of the receive aperture to form one or a plurality of receive beams. Cascaded summers or a single summer may be used. In one embodiment, the beamform summer is operable to sum in-phase and quadrature channel data in a complex manner such that phase information is maintained for the formed beam.

One or more receive beams are formed in response to each transmit beam. In the example of FIG. 2, two receive beams are simultaneously formed (e.g., formed from channel data responsive to the same transmit beam) in response to each transmit beam. In the example of FIG. 3, five or more receive beams are simultaneously formed in response to each transmit beam. At least some of the receive beams responsive to spatially distinct transmit beams are collinear, such as shown in FIGS. 2 and 3. All the receive beams may be collinear with one or more other receive beams responsive to different transmit beams. For at least some of the scan lines, two or more substantially collinear receive beams are formed.

The control processor 42 is a general processor, digital signal processor, field programmable gate array, application specific integrated circuit, digital circuit, analog circuit, or combinations thereof. The control processor 24 is configured by software, firmware, and/or hardware to control the image forming process and/or to calculate coherence metrics for ultrasound data from collinear receive beams.

As part of the image forming process, the control processor 42 sets a scan pattern or acquisition sequence, number of simultaneous receive beams, a number of sequential beams, a number of sub apertures, a number of focal zones in a same scan line, a number of component beams compounded together, receive multiple beam parameters, combination function, component beam temporal frequency response, component beam spatial frequency response, combinations thereof, or other now known or later developed parameters for coherent combination by the coherent image former 36. The parameters are set as a function of received ultrasound data, predetermined settings, and/or user input.

In one embodiment, the control processor 42 is configured to determine one or more coherence metrics (e.g., correlation, phase consistency, standard deviation of either, or combinations thereof) for ultrasound data from collinear receive beams. The control processor 42 may derive further information, such as the standard deviation, and/or determine weights based on the coherence metrics. The ultrasound data represented beamformed samples on a same scan line are buffered or accessed from a memory by the control processor 42 for calculating the coherence metrics. In other embodiments, the controller of the receive beamformer 34 or the coherent image former 36 is configured to calculate the coherence metrics.

The coherent image former 36 is a general processor, digital signal processor, control processor, application specific integrated circuit, digital circuit, digital signal processor, analog circuit, combinations thereof, or other now known or later developed processors for performing line synthesis. In one embodiment, the coherent image former 36 is part of the receive beamformer 34 or control processor 36, but a separate or dedicated processor or circuit may be used in other embodiments. The coherent image former 36 includes memory buffers, complex multipliers and complex summers, but other components may be used. The coherent image former 36 is configured by software, firmware, and/or hardware. For example, the control processor 42 controls operation of the coherent image former 36 using codes or instructions buffered in the image former 36.

The coherent image former 36 is configured to synthesize lines as a function of adaptive parameters. For example, the coherent image former 36 is operable to form data representing a range of depths or lateral locations from sequential component collinear beams or combine data from different sub apertures to form one or more lines of collinear data. Ultrasound lines are formed from receive beams formed by the receive beamformer 34. The synthesis may involve inter-beam phase correction as a first step. Multiple stages or parallel processing may be used to increase the throughput or number of receive beams processed for real-time imaging, such as associated with three- or four-dimensional imaging. The synthesis then combines the phase corrected beams through a coherent (i.e., phase sensitive) filter to form synthesized ultrasound lines.

In one embodiment, the coherent image former 36 includes pre-detection axial filtering for receive pulse shaping and decoding, phase correction to phase align receive beams in one or both lateral axes, and beam- and range-dependent gain for spatial weighting and/or masking of beams (i.e., weighting receive beams outside a transmit beam region with a zero, such as for plane wave transmissions with a sector or Vector® receive format).

The coherent image former 36 operates on the beam-formed ultrasound data. Collinear receive beams are combined for line synthesis after any phase and/or amplitude correction. The combination is prior to detection. Any combination function may be used, such as summation, weighted summation or nonlinear combination of collinear receive beams formed at distinct transmit events. The line synthesis is of receive beams responsive to transmit beams along different scan lines. For example, the line synthesis is for phase inversion (receive beams associated with transmissions with different, such as opposite, phases), contrast pulse sequences (receive beams associated with transmissions at different amplitudes and/or phases), color flow, transmit focus synthesis (receive beams associated with transmissions to different focal depths), or other image forming processes coherently combining collinear receive beams from distinct transmissions along a same scan line. As another example, the line synthesis is for combination of collinear receive beams formed in response to distinct noncollinear transmit events as part of B-mode imaging.

The coherent image former 36 calculates or receives weights or coherence metrics for the component receive beams being combined. The coherent combination adapts to the coherence metrics. In one embodiment, the coherent image former 36 weights one or more (e.g., all) of the component beams to be combined. A relative weighting is used. One component beam is emphasized relative to another component beam, which is de-emphasized. This relative weighting uses separate weights for each component beam or weights one or a subset of component beams without weighting one or more other component beams. The weighted ultrasound data is then coherently combined. In another embodiment, the coherent image former 36 weights an output of the coherent combination. The results of the coherent combination are increased or decreased based on the coherence metric.

Additional, different or fewer components and associated functions may be provided by the coherent image former 36. Analytic beam interpolation forms new lines of data between receive beams from the same transmissions (e.g., $RX_{1A}$ combined with $RX_{1B}$ of FIG. 2 to form an analytic beam, such as along the scan line for $TX_1$). Analytic beams may increase the lateral sampling rate to prevent aliasing due to noncollinear event synthesis. Pre-detection lateral filtering provides lateral whitening or artifact reduction. Analytic line interpolation forms new lines of data between synthesized lines. Analytic line interpolation may increase the lateral sampling rate to prevent aliasing due to envelope detection.

The detector 38 is a general processor, digital signal processor, control processor, application specific integrated circuit, digital circuit, digital signal processor, analog circuit, field programmable gate array, combinations thereof, or other now known or later developed processors for envelope detection. Any ultrasound detector may be used, such as a B-mode or Doppler detector. The detector 38 detects any of various characteristics, such as amplitude, intensity (i.e., amplitude squared) or log-compressed amplitude.

The detector 38 may include a scan converter. The scan converter reformats the ultrasound data from a scan format (e.g., polar coordinate) to a display format (e.g., Cartesian coordinate). Spatial and/or temporal filters may be included.

The display 40 is a monitor, LCD, LED, plasma, projector, printer, or other now known or later developed visual representation device. The display 40 includes a display plane into which display values for an image are loaded. The display 40 is configured by the stored display values to generate an image. The image is generated from the output of the coherent combination as adapted for the coherence metrics between the ultrasound data of the component collinear receive beams. Any combination of images with or without annotation, graphics, or other information are displayed.

The instructions for implementing the adaptive processes, methods and/or techniques discussed above are provided on computer-readable storage media or memories 44, such as a cache, buffer, RAM, removable media, hard drive or other computer readable storage media. The instructions are implemented on a single device, such as the control processor 42, the beamformer 30, 34, the coherent image former 36, and/or a plurality of devices in a distributed manner. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for adaptive ultrasound processing in an ultrasound system, the method comprising:
    forming spatially distinct first receive beams responsive to a first transmit event;
    forming spatially distinct second receive beams responsive to a second spatially distinct transmit event, where at least one of the first beams is substantially collinear with one of the second beams;
    calculating a correlation coefficient or phase difference between the substantially collinear receive beams;
    setting a weight as a function of the correlation coefficient or phase difference;
    combining coherently the substantially collinear receive beams responsive to the spatially distinct first and second transmit events, the combining or an output of the combining being a function of the weight; and
    generating an image from the output of the coherent combination.

2. The method of claim 1 wherein calculating comprises calculating the correlation coefficient, and wherein setting the weight comprises setting the weight as a function of the correlation coefficient.

3. The method of claim 2 wherein calculating comprises calculating the correlation coefficient as a first lag correlation coefficient.

4. The method of claim 1 wherein calculating comprises calculating the phase difference, and wherein setting the weight comprises setting the weight as a function of the phase difference.

5. The method of claim 4 wherein calculating comprises calculating the phase difference as a first lag phase change.

6. The method of claim 1 wherein calculating comprises calculating a standard deviation of the correlation coefficient or the phase difference, and wherein setting the weight comprises setting the weight as a function of the standard deviation.

7. The method of claim 1 wherein calculating comprises calculating both the correlation coefficient and the phase difference, and wherein setting the weight comprises setting the weight as a function of both the correlation coefficient and the phase difference.

8. The method of claim 1 wherein combining coherently comprises relatively weighting the substantially collinear receive beams as a function of the weight and combining the relatively weighted substantially collinear receive beams.

9. The method of claim 1 wherein combining coherently comprises combining and weighting the output of the combining as a function of the weight.

10. The method of claim 1 wherein combining coherently comprises line synthesis prior to detection.

11. The method of claim 1 further comprising:
    forming spatially distinct third receive beams using data from a third transmit event spatially distinct from the first and second transmit events, at least one of the third beams being substantially collinear with the one of the first beams and the one of the second beams;
    wherein calculating comprises calculating the correlation coefficient or phase difference as a first lag correlation coefficient between the collinear ones of the first, second and third receive beams.

12. The method of claim 1 further comprising:
    generating a multi-dimensional representation of the weight, the correlation coefficient, or the phase difference.

13. A system for adaptive post-beamformation synthetic aperture, the system comprising:
    a transmit beamformer configured to transmit first and second transmit beams along first and second scan lines, the first scan line different than the second scan line;
    a receive beamformer configured to form a first receive beam in response to the first transmit beam and a second receive beam in response to the second transmit beam, the first receive beam collinear with the second receive beam;
    a processor configured to determine a coherence metric between the first and second receive beams;
    a coherent summer configured to coherently combine the first and second receive beams, the combination providing an output, the combination or the output of the combination being a function of the coherence metric; and
    a display configured to generate an image from the output.

14. The system of claim 13 wherein the processor is configured to determine the coherence metric as a correlation coefficient or standard deviation of the correlation coefficient.

15. The system of claim 13 wherein the processor is configured to determine the coherence metric as a phase shift or standard deviation of the phase shift.

16. The system of claim 13 wherein the coherent summer is configured to relatively weight the first and second receive beams and combine the relatively weighted first and second receive beams, the relative weight being a function of the coherence metric.

17. The system of claim 13 wherein the coherent summer is configured to weight the output, the weight being a function of the coherence metric.

18. A computer readable storage medium having stored therein data representing instructions executable by a programmed processor adaptive post-beamformation synthetic aperture, the storage medium comprising instructions for:
    calculating a beam-to-beam correlation coefficient or a beam-to-beam phase change for ultrasound data generated using collinear beams acoustically formed in a patient; and
    generating an ultrasound image as a function of the beam-to-beam correlation coefficient or phase change and as a function of the collinear beams.

19. The computer readable storage medium of claim 18, wherein the instruction for generating comprises:
    analytically synthesizing the ultrasound data representing the collinear beams, the analytic synthesizing resulting an output amplitude;
    adjusting the output amplitude or a contribution of the ultrasound data of one of the collinear beams in the analytically synthesizing, the adjusting of the output amplitude or the contribution being based on the beam-to-beam correlation coefficient or phase change.

20. The computer readable storage medium of claim 18, wherein the instruction for calculating comprises calculating both the beam-to-beam correlation coefficient and the beam-to-beam phase change;

further comprising an instruction for determining a weight based on both the beam-to-beam correlation coefficient and the beam-to-beam phase change;

wherein the instruction for generating comprises generating the ultrasound image as a function of both the beam-to-beam correlation coefficient and the beam-to-beam phase change.

* * * * *